(12) United States Patent
Dong et al.

(10) Patent No.: US 11,034,315 B2
(45) Date of Patent: Jun. 15, 2021

(54) ADVANCED THIN-WALLED STRUCTURES FOR ENHANCED CRASH PERFORMANCE

(71) Applicant: Tesla, Inc., Palo Alto, CA (US)

(72) Inventors: Guang Dong, Hayward, CA (US); Sekhar Reddy Biddala Reddy, Pleasanton, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/385,766

(22) Filed: Apr. 16, 2019

(65) Prior Publication Data

US 2019/0315300 A1     Oct. 17, 2019

Related U.S. Application Data

(60) Provisional application No. 62/659,012, filed on Apr. 17, 2018.

(51) Int. Cl.
*B60R 19/34* (2006.01)
*B60R 19/26* (2006.01)

(52) U.S. Cl.
CPC ........ *B60R 19/34* (2013.01); *B60R 2019/264* (2013.01)

(58) Field of Classification Search
CPC .... B60R 19/34; B60R 19/26; B60R 2019/264
USPC ...................................................... 296/133
See application file for complete search history.

(56) References Cited

U.S. PATENT DOCUMENTS

| | | | |
|---|---|---|---|
| 7,543,537 B2 * | 6/2009 | Seitzberger | B60R 19/34 105/392.5 |
| 8,459,726 B2 * | 6/2013 | Tyan | F16F 7/12 296/187.03 |
| 10,081,391 B1 * | 9/2018 | Tyan | F16F 7/121 |
| 2002/0063433 A1 * | 5/2002 | Gotanda | B60R 19/34 293/132 |
| 2009/0085362 A1 * | 4/2009 | Terada | B60R 19/34 293/132 |
| 2010/0066124 A1 * | 3/2010 | Terada | B60R 19/34 296/187.09 |

(Continued)

FOREIGN PATENT DOCUMENTS

| | | | | |
|---|---|---|---|---|
| CN | 106004745 A | * | 10/2016 | |
| DE | 102011119092 A1 | * | 5/2013 | ............. B60R 19/18 |

OTHER PUBLICATIONS

Kenyon et al., 2018, Parameteric Design of Multi-Cell Thin-Walled Structures for Improved Crashworthiness with Stable Progressive Buckling Mode, Thin-Walled Structures, 131:76-87.

(Continued)

*Primary Examiner* — Hilary L Gutman
(74) *Attorney, Agent, or Firm* — Knobbe, Martens, Olson & Bear, LLP

(57) ABSTRACT

A crash can for a vehicle includes a multi-cell structure that includes at least four hollow cuboids, each defined by four walls that meet at 90 degree angles and at least two of the cuboids share a wall. In another example, a crash can includes a multi-cell structure that includes a hollow cuboid having four walls, and four hollow isosceles trapezoidal prisms having a long base, a short base, and two legs. The multi-cell structures provided herein may increase energy absorption by the crash can if involved in a collision, reducing energy transfer to a vehicle frame and occupants therein.

15 Claims, 7 Drawing Sheets

(56) References Cited

U.S. PATENT DOCUMENTS

| | | | |
|---|---|---|---|
| 2010/0072788 A1* | 3/2010 | Tyan | B62D 21/15 296/205 |
| 2010/0102592 A1* | 4/2010 | Tyan | B62D 21/15 296/187.09 |
| 2012/0205927 A1* | 8/2012 | Asakawa | B60R 19/34 293/132 |
| 2012/0261949 A1* | 10/2012 | Tyan | B60R 19/34 296/187.03 |
| 2015/0084374 A1* | 3/2015 | Tyan | B62D 21/15 296/187.03 |
| 2016/0375935 A1* | 12/2016 | Tyan | B62D 21/02 296/205 |
| 2017/0274933 A1* | 9/2017 | Tyan | B62D 21/152 |
| 2017/0307137 A1* | 10/2017 | Tyan | B32B 25/08 |
| 2018/0099696 A1* | 4/2018 | Tyan | B62D 21/152 |
| 2018/0319441 A1* | 11/2018 | Tyan | B62D 25/025 |
| 2018/0328435 A1* | 11/2018 | Tyan | F16F 7/121 |
| 2019/0077348 A1* | 3/2019 | Coppuck | B60R 19/34 |

OTHER PUBLICATIONS

Reddy, Feb. 2015, Multi Cornered Thin Wall Sections for Crashworthiness and Occupant Protection, PhD Thesis, RMIT University, 205 pp.

* cited by examiner

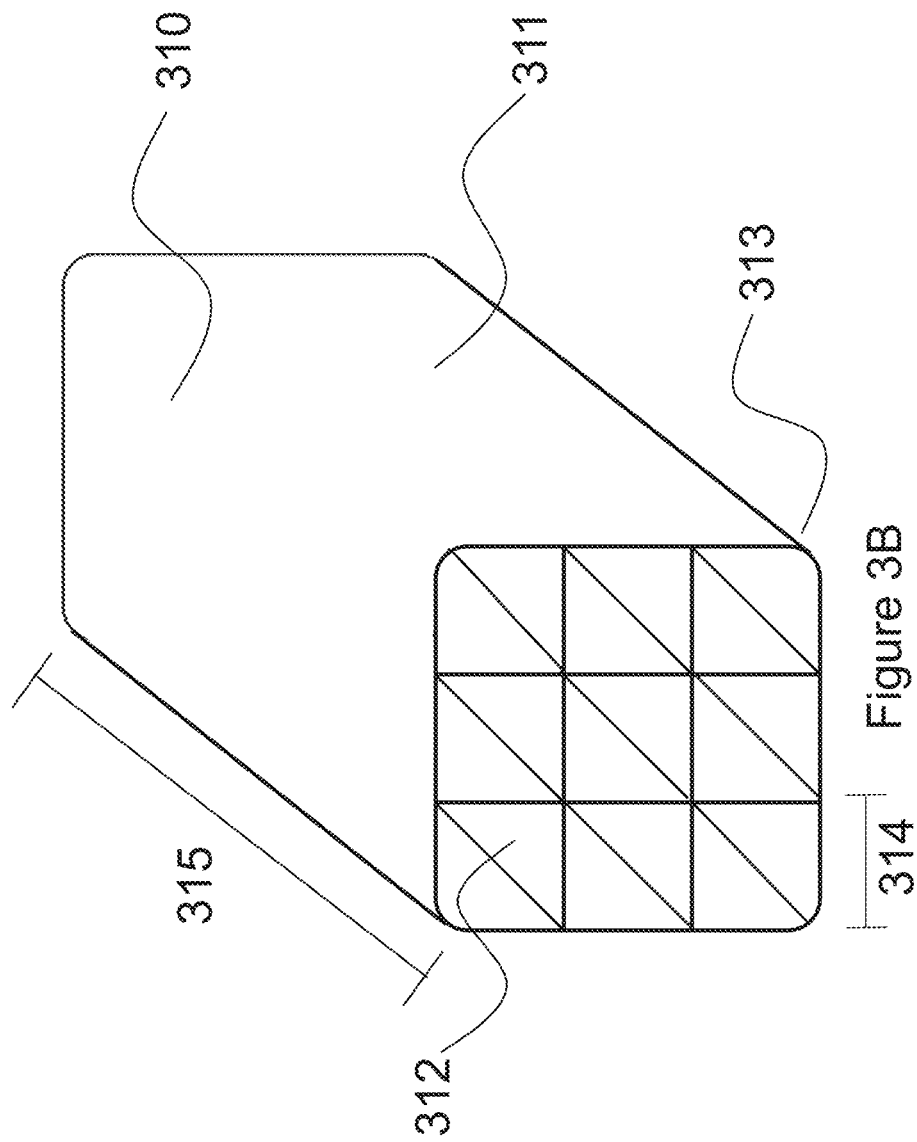

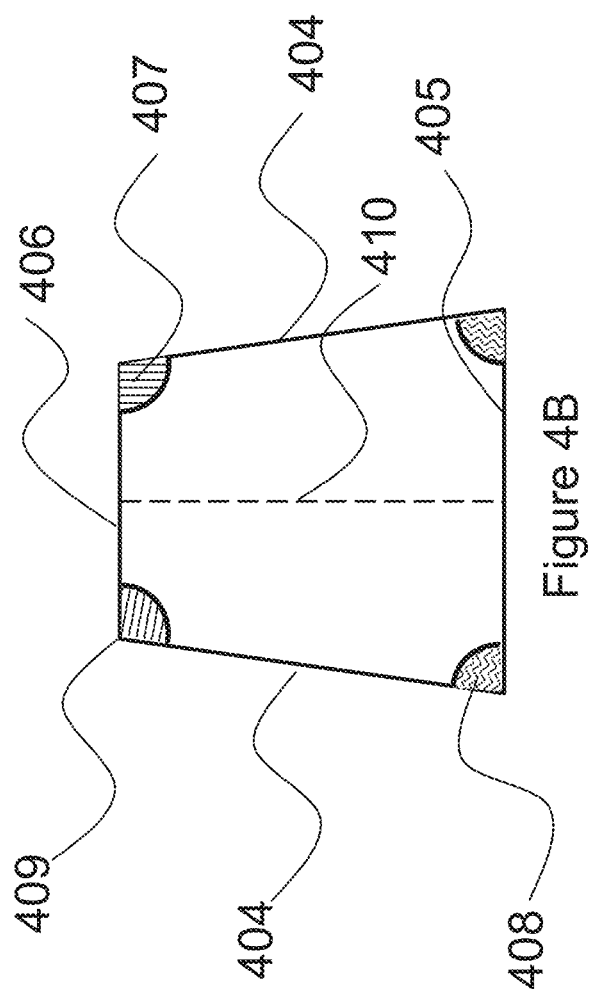

US 11,034,315 B2

ADVANCED THIN-WALLED STRUCTURES FOR ENHANCED CRASH PERFORMANCE

CROSS-REFERENCE TO RELATED APPLICATIONS

This Application claims priority to U.S. Provisional Application 62/659,012, entitled "ADVANCED THIN-WALLED STRUCTURE FOR ENHANCED CRASH PERFORMANCE" filed Apr. 17, 2018, the entire content of which is hereby incorporated by reference.

BACKGROUND

Technical Field

The present disclosure relates to a thin-walled structure for the crash zones of a vehicle, otherwise known as a crash can. More particularly, the present disclosure relates to a crash can of a vehicle that absorbs energy upon impact in an efficient way.

Description of Related Art

Passenger vehicles such as cars, trucks or the like typically include metal structures at the front of the frame with which to absorb the energy of an impact. These structures are typically a square, single cell tube directly mounted to the front of the frame of the vehicle, which will deform in a stable manner and absorb energy during an impact, e.g., collision.

SUMMARY

In some embodiments a crash can for a vehicle includes a multi-cell structure that includes at least four hollow cuboids, each defined by four walls. The four walls of the hollow cuboids meet at 90 degree angles and at least two of the cuboids share a wall.

In some embodiments a crash can for a vehicle includes a multi-cell structure that includes a hollow cuboid and four hollow isosceles trapezoidal prisms. The hollow cuboid has four walls and the four hollow isosceles trapezoidal prisms each have a long base, a short base, and two legs. The four hollow isosceles trapezoidal prisms are arranged around the hollow cuboid such that the long base of each hollow isosceles trapezoidal prism shares one of the walls of the hollow cuboid.

BRIEF DESCRIPTION OF THE DRAWINGS

FIG. 3B illustrates a crash can according to some embodiments.

FIG. 4B illustrates a cross section of a hollow isosceles trapezoidal prism according to some embodiments.

Figure 1:
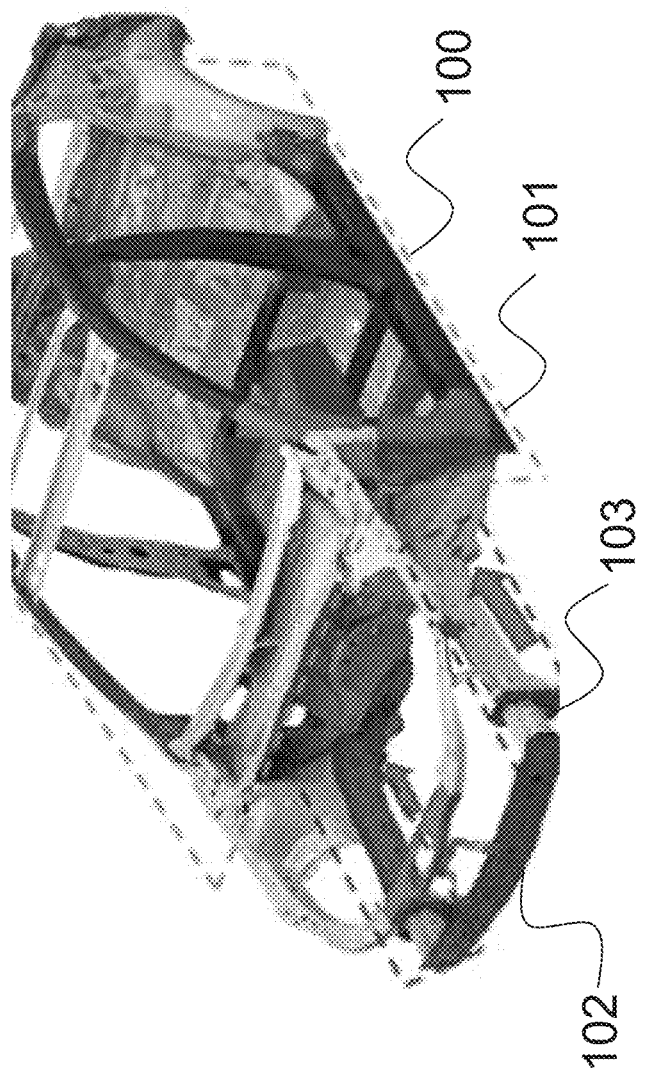
FIG. 1 illustrates an example of how a crash can may be used in a vehicle according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure provides examples of systems and techniques for providing a structure (e.g., a crash can, rail, etc.) to absorb energy via axial progressive folding deformation during a collision. Exemplary structures disclosed are capable of absorbing more energy in a more efficient manner during a vehicle collision than conventional single cell structures. The energy absorption of the structures is provided by a stable and efficient method of progressive collapse that increases the amount of energy that will be absorbed. Exemplary structures provided herein also have manufacturing advantages in terms of the process and materials that can be used. These manufacturing advantages result in a structure that increases energy absorption per unit mass, or the specific energy absorption of the structure, while being lighter than conventional structures to allow for a more even distribution of the weight of a vehicle and a lighter structure in the front end or other various desired portions of the vehicle. The advantages in material and weight allow for vehicles that are designed to be lighter and more energy or fuel efficient to maintain or improve on the safety of vehicle occupants and critical vehicle components (e.g., a high voltage battery) by increasing the amount of energy absorbed by the crash structure in a collision. Accordingly, vehicles seeking to shed weight or increase the specific energy in a collision zone may be both stylish and safe and thus make the vehicle more commercially feasible.

Reference will now be made in detail to specific aspects or features, examples of which are illustrated in the accompanying drawings. Like reference numerals refer to corresponding parts throughout the figures.

FIG. 1 illustrates an example of how crash can 103 can be mounted to the front structure of a vehicle 100. The structure generally includes a frame 101, a bumper 102, and a crash can 103. The crash can 103 may be connected to the frame 101 and bumper 102 with any acceptable fastening method, for example with welds, rivets, or other known fastening devices. The crash can 103 is placed in between the frame 101 and the bumper 102, with each end of the crash can 103 attached to either the frame 101 or the bumper 102. Accordingly, when the front structure of the vehicle 100 is involved in a collision, the bumper 102 will first receive the force of the collision. This force is transferred from the bumper 102 to the crash can 103, which is designed to deform and absorbs energy. In this manner, the amount of energy received by frame 101 during the collision is reduced. Thus, occupants of vehicle 100 will be less likely to be injured and critical vehicle components (e.g., a high voltage battery) will be less likely to be damaged from the force of collision or the deforming metal of frame 101 during the collision.

Figure 2A:
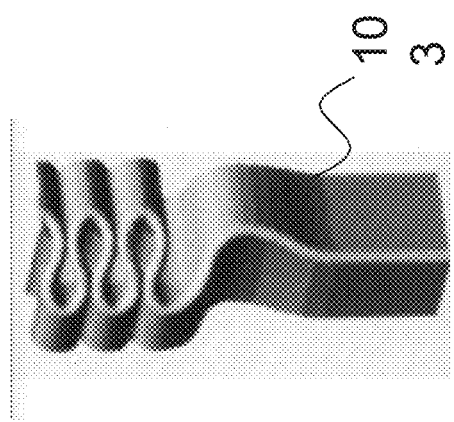
FIG. 2A illustrates an example of a crash can undergoing stable deformation.
Figure 2B:
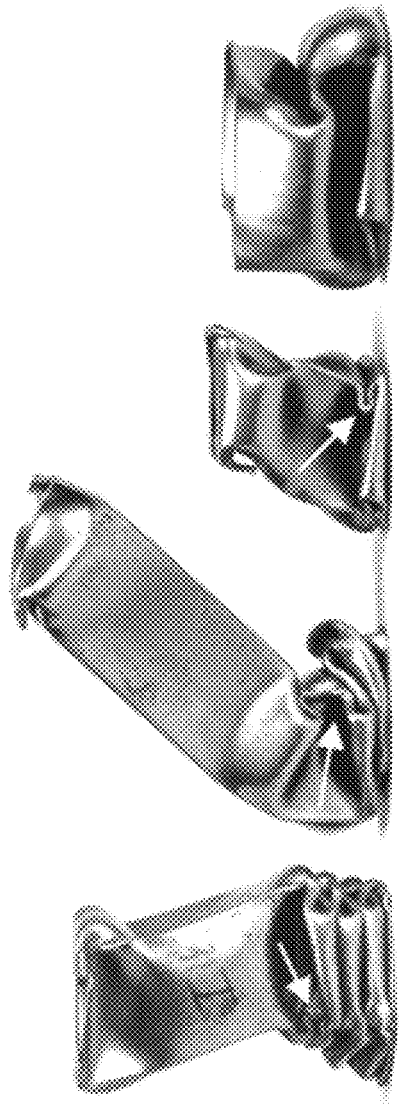
FIG. 2B illustrates examples of a crash can undergoing unstable deformation.

FIG. 2A illustrates how crash can 103 may deform when subjected to the force of a collision. Crash can 103 absorbs energy via plastic deformation. Crash can 103 absorbs the most energy by maximizing the plastic deformation through progressive buckling. Progressive buckling is a stable buckling mode characterized by top down, regular folding of the structure as seen in FIG. 2A. In contrast, non-progressive buckling drastically reduces the amount of energy that crash can 103 can absorb. Examples of non-progressive buckling can be seen in FIG. 2B. Accordingly, it is desired that crash can 103 will maximize plastic deformation through progressive buckling in order to absorb as much energy as possible in a stable progressive manner.

In some embodiments a crash can described herein includes a multi-cell structure that includes at least four hollow cuboids each defined by four walls that meet at 90 degree angles and at least two of the hollow cuboids share a wall. In some embodiments the crash can includes a multi-cell structure that includes nine hollow cuboids. In some embodiments the crash can is comprised of aluminum alloy and is made of a piece of extruded aluminum alloy. In some embodiments the thickness of the walls is between 1 mm and 3.5 mm. In some embodiments the length of each wall is between 26 mm and 38 mm. In some embodiments the crash can also include four outside walls that meet at 90 degree angles to form four corners. In some embodiments the four corners are rounded.

In some embodiments a crash can includes a multi-cell structure that includes a hollow cuboid having four walls, and four hollow isosceles trapezoidal prisms having a long base, a short base and two legs. In some embodiments the four hollow isosceles trapezoidal prisms are arranged around the hollow cuboid such that each of the hollow isosceles trapezoidal prisms shares its long base with one of the walls of the hollow cuboid. In some embodiments the cross section of the crash can forms a substantially cross shape. In some embodiments the short base of each hollow isosceles trapezoidal prism joins the legs such that an obtuse corner angle is created at each junction. In some embodiments the obtuse corner angle is between 90 degrees and 95 degrees. In some embodiments the long base of each hollow isosceles trapezoidal prism joins the legs such that an acute corner angle is created at each junction. In some embodiments the acute corner angle is between 85 degrees and 90 degrees. In some embodiments the crash can is comprised of an aluminum alloy. In some embodiments the crash can is comprised of an extruded piece of aluminum alloy. In some embodiments each of the walls of the hollow cuboid, and the long base, the short base and the two legs of each hollow isosceles trapezoidal prism are between 1 mm and 3.5 mm thick. In some embodiments the length of each of the walls of the hollow cuboid is between 26 mm and 38 mm. In some embodiments the length of the legs of each of the hollow isosceles trapezoidal prisms is the same as the length of the walls of the hollow cuboid. In some embodiments the length of the legs of each of the hollow isosceles trapezoidal prisms is between 26 mm and 38 mm. In some embodiments the hollow isosceles trapezoidal prism also has a height measured between the long base and the short base. In some embodiments the height is the same as the length of the long base of the hollow isosceles trapezoidal prism. In some embodiments the outside corner where each of the short bases meets one of the legs is rounded.

Figure 3A:
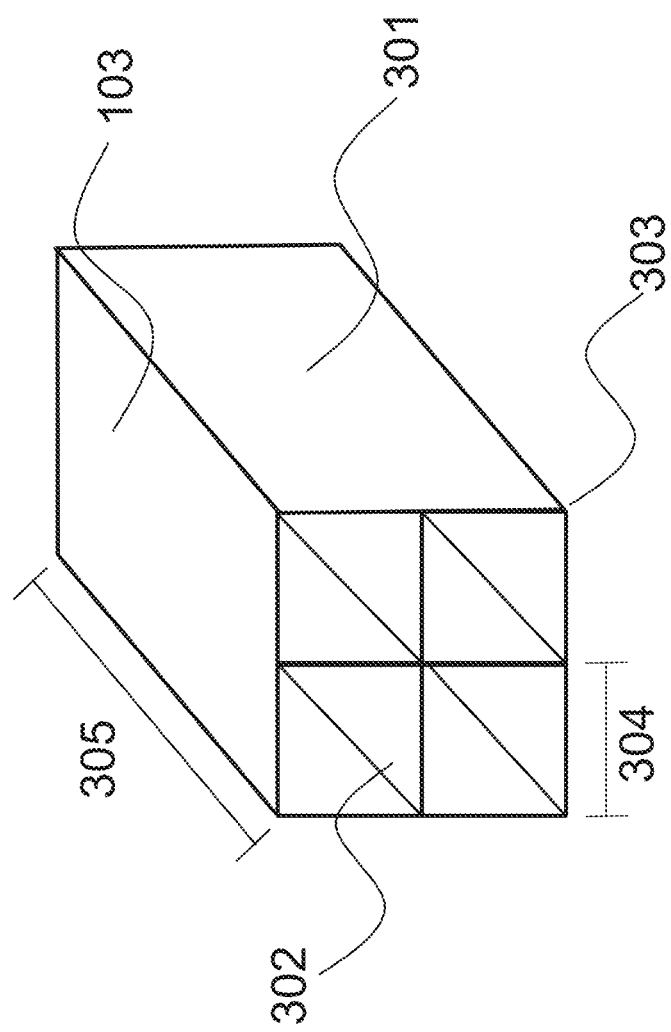
FIG. 3A illustrates a crash can according to some embodiments.

FIG. 3A illustrates a crash can 103 in accordance with some embodiments. Crash can 103 includes the following portions: outer wall 301, hollow cuboids 302, and corners 303. In some embodiments crash can 103 is made of a single piece of material, as opposed to a component with multiple, interconnected pieces or a single component that has been formed by welding or otherwise permanently connecting together multiple pieces. In some embodiments crash can 103 is optionally formed by extruding a material (e.g., aluminum alloy). In some embodiments crash can 103 is optionally formed as a single piece by an additive process, molding, carving, or etching. In some embodiments the additive process, molding, carving, or etching may be controlled by a computer. Any carving or etching may be done using any appropriate tooling (e.g., lasers or chemicals). In some embodiments crash can 103 is optionally formed by interconnecting multiple pieces of a material with welding or other permanent forms of connection. In some embodiments, crash can 103 is comprised of an aluminum alloy.

In some embodiments the four walls of each hollow cuboid 302 meet each other wall at a 90 degree angle. In some embodiments, each hollow cuboid 302 shares at least one wall with another hollow cuboid 302. In some embodiments the crash can 103 is comprised of four hollow cuboids 302. In some embodiments, the crash can 103 is comprised of nine hollow cuboids 302. In some embodiments the hollow cuboids 302 are arranged so that the crash can 103 is substantially cuboid in shape. Although some embodiments of the crash can 103 contain four hollow cuboids, one possessing skill in the art will realize that the crash can could optionally have any number of hollow cuboids.

In some embodiments, the corners 303 created where each segment of outer wall 301 meets the other segments of outer wall 301 are rounded with a corner radius between 0.1 mm and 5 mm. For example, the corner radius could be 1.5 mm, 2 mm, 2.5 mm, 3 mm, 3.5 mm, 4 mm, 4.5 mm, or 5 mm.

In some embodiments the thickness of each of the walls is between 1 mm and 3.5 mm. In some embodiments the length of each wall 304 of each hollow cuboid 302 is between 26 mm and 38 mm. In some embodiments the length 305 of crash can 103 is between 150 mm and 450 mm.

FIG. 3B illustrates crash can 310 in accordance with some embodiments. Crash can 310 includes the following portions: outer wall 311, hollow cuboids 312, and corners 313. In some embodiments crash can 310 is made of a single piece of material, as opposed to a component with multiple, interconnected pieces or a single component that has been formed by welding or otherwise permanently connecting together multiple pieces. In some embodiments crash can 310 is optionally formed by extruding a material (e.g., aluminum alloy). In some embodiments crash can 310 is optionally formed as a single piece by an additive process, molding, carving, or etching or by interconnecting multiple pieces of a material with welding or other permanent forms of connection (as described above).

In some embodiments the four walls of each hollow cuboid 312 meet each other wall at a 90 degree angle. In some embodiments, each hollow cuboid 312 shares at least one wall with another hollow cuboid 312. In some embodiments, the crash can 310 is comprised of nine hollow cuboids 312. In some embodiments the hollow cuboids 312 are arranged so that the crash can 310 is substantially cuboid in shape. Although some embodiments of the crash can 310 contain nine hollow cuboids, one possessing skill in the art will realize that the crash can could optionally have any number of hollow cuboids.

In some embodiments, the corners 313 created where each segment of outer wall 311 meets the other segments of outer wall 311 are rounded with a corner radius between 0.1 mm and 5 mm. For example, the corner radius could be 1.5 mm, 2 mm, 2.5 mm, 3 mm, 3.5 mm, 4 mm, 4.5 mm, or 5 mm.

In some embodiments the thickness of each of the walls is between 1 mm and 3.5 mm. In some embodiments the length of each wall 314 of each hollow cuboid 302 is between 26 mm and 38 mm. In some embodiments the length 315 of crash can 310 is between 150 mm and 450 mm.

Figure 4A:
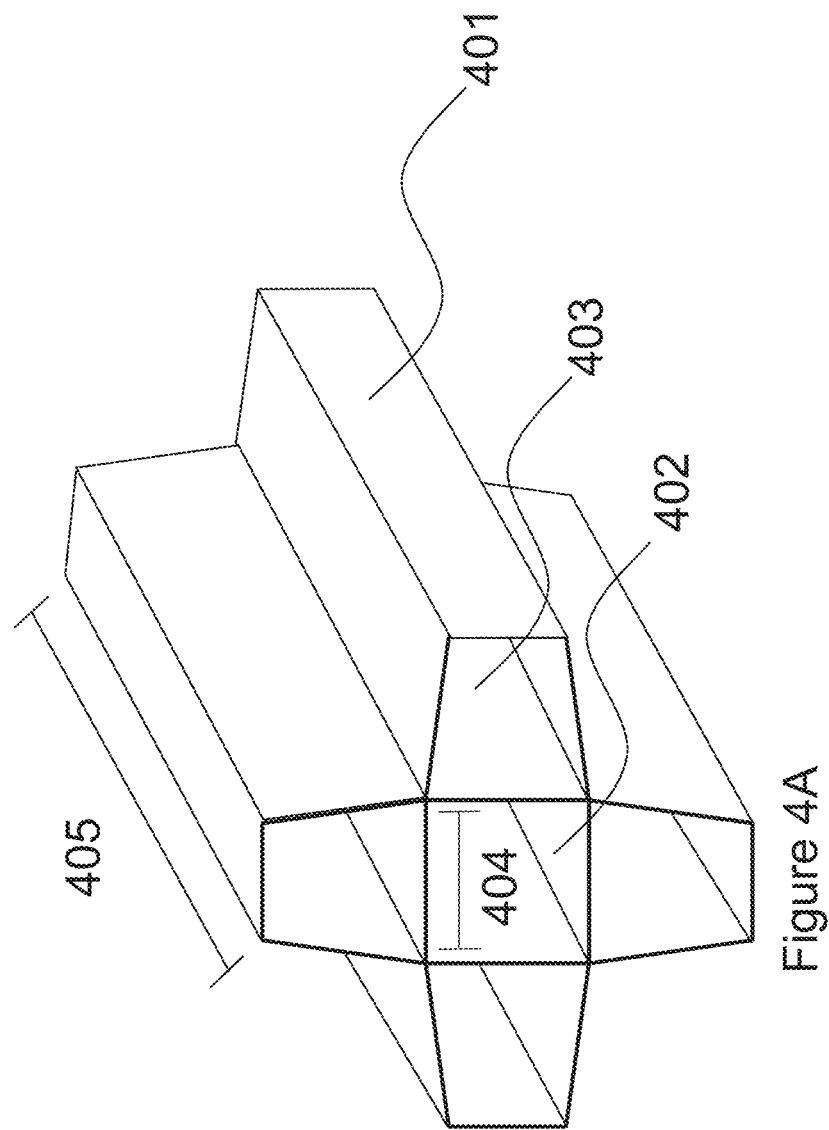
FIG. 4A illustrates a crash can according to some embodiments.

FIG. 4A illustrates crash can 401 in accordance with some embodiments. Crash can 401 is a five-cell structure including the following portions: hollow cuboid 402 and hollow isosceles trapezoidal prisms 403. In some embodiments hollow cuboid 402 is made of four walls. In some embodiments the four walls of hollow cuboid 402 meet at 90 degree angles. In some embodiments the length of each wall 404 of hollow cuboid 402 is between 26 mm and 38 mm.

FIG. 4B illustrates a cross section hollow isosceles trapezoidal prism 403 in accordance with some embodiments. The cross section of hollow isosceles trapezoidal prism 403 is comprised of: two legs 404, a long base 405, and a short base 406. In some embodiments the legs 404 meet the short base 406 to create corner angles 407. In some embodiments the legs 404 meet the long base 405 to create corner angles 408. In some embodiments corner angles 407 and corner angles 408 are 90 degrees. In some embodiments, corner angles 407 are obtuse angles measuring between 90 degrees and 95 degrees. In some embodiments corner angles 408 are acute angles measuring between 85 degrees and 90 degrees. In some embodiments the corners 409 created where the legs 404 meet the short base 406 are rounded with a corner radius between 0.1 mm and 5 mm. For example, the corner radius could be 1.5 mm, 2 mm, 2.5 mm, 3 mm, 3.5 mm, 4 mm, 4.5 mm, or 5 mm.

In some embodiments the length of the long base 405 is between 26 mm and 38 mm. The height 410 of hollow isosceles trapezoidal prism 403 is the same as the length of the long base 405. In some embodiments the two legs 404 are the same length as the long base 405. In some embodiments the long base 405 is the same length as the short base 406. One possessing skill in the art will realize that the lengths of the two legs 404 and the short base 406 will vary depending on the corner angles 407 and 408 and the length of the long base 405.

Figure 5:
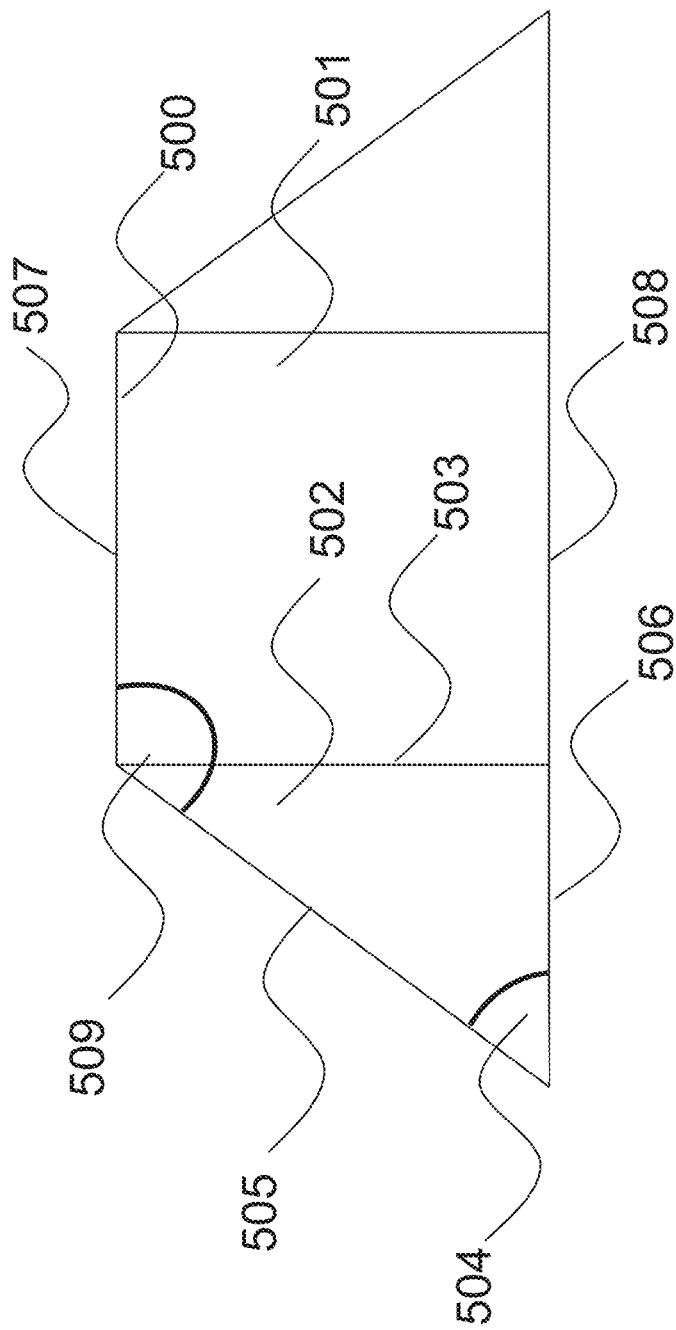
FIG. 5 illustrates a cross section of a hollow isosceles trapezoidal prism used to calculate various measurements.

FIG. 5 illustrates a cross section of a hollow isosceles trapezoidal prism used to calculate the lengths of the various sides (note that the angles are exaggerated relative to FIG. 4B for illustrative purposes). The cross sectional isosceles trapezoid 500 is divided into two triangles 502 and a square 501 where each of the legs 505 meets the short base 507. As discussed above, given a height 503, and an angle measurement of corner angles 504 or 509, the length of leg 505 and the length of short base 507 may be found using the following equations.

$$\text{Length of Leg } 505 = \frac{\text{Height } 503}{\text{Tan(Corner Angle } 504)}$$

Length of Short Base 507 =

Length of Long Base 508 − 2 ∗ (Length of Short Side 506)

$$\text{Where, Length of Short Side } 506 = \frac{\text{Height } 503}{\text{Sin(Corner Angle } 504)}$$

If only corner angle 509 is available, corresponding corner angle 504 may be found by subtracting corner angle 509 from 180 degrees. Tan( ) and sin( ) refer to the trigonometric functions tangent and sine respectively.

Returning to FIG. 4A, each of the hollow isosceles trapezoidal prisms 403 are arranged around hollow cuboid 402 such that the long base 405 of each hollow isosceles trapezoidal prism 403 shares one of the walls of the hollow cuboid 402. In some embodiments the cross section of the crash can 401 comprised of the hollow isosceles trapezoidal prisms 403 and the hollow cuboid 402 form a substantially cross shaped structure.

The geometry may also be described through an understanding of the Super Folding Element (SFE) theory. The SFE theory is a method for estimating the mean crush force and total energy absorbed by a thin-walled structure when it undergoes a crushing process. SFE theory assumes that the overall buckling mode is stable and thus involves periodic regular folding of the structure. These regular folds are assumed to be identical to each other thus requiring only the determination of the mean crush force of one fold to define the mean force for an entire column. This characteristic fold can be further broken down into corner elements, as the corners are the main energy-absorbing component. For example, in a four cell structure as discussed above, the cross-section would be broken down into three types of corner elements: two-flange elements, T-elements, and criss-cross elements. The four cell structure contains four two-flange corner elements, four T corner elements, and one criss-cross corner element. A nine cell structure contains four two-flange corner elements, eight T corner elements, and four criss-cross elements. In the five cell structure described above there are eight two-flange corner elements, zero T corner elements and four criss-cross elements. Flanges modeled in SFE have uniform thickness, cover half of the cell width, and have height 2∗H, where H is the half folding wave length. The angle between flanges of a corner element can be either acute, obtuse or orthogonal. For further information about SFE theory and how these structures can be modeled please refer to the following two articles: Kenyon et al., *Parametric Design of Multi-Cell Thin-Walled Structures for Improved Crashworthiness with Stable Progressive Buckling Mode*; Reddy, *Multi Cornered Thin Wall Sections for Crashworthiness and Occupant Protection*, RMIT UNIVERSITY (February 2015). The disclosures of the above publications are incorporated herein by reference in their entireties, and attached hereto as appendices.

In some embodiments crash can 401 is made of a single piece of material, as opposed to a component with multiple, interconnected pieces or a single component that has been formed by welding or otherwise permanently connecting together multiple pieces. In some embodiments crash can 401 is optionally formed by extruding a material (e.g., aluminum alloy). In some embodiments crash can 401 is optionally formed as a single piece by an additive process, molding, carving, or etching or by interconnecting multiple pieces of a material with welding or other permanent forms of connection (as described above). In some embodiments crash can 401 is comprised of an aluminum alloy.

In some embodiments the walls of crash can 401 have a thickness between 1 mm and 3.5 mm. In some embodiments the length 405 of crash can 401 is between 150 mm and 450 mm.

One advantage of the various embodiments of the crash cans disclosed herein is that the multi-cell structure of the crash cans provides a more stable form of plastic deformation when the crash can is subject to the force of a collision relative to a single cell (tube) structure. Further, the various geometries described herein may further provide more stable plastic deformation relative to conventional geometries. As described herein, plastic deformation is the process of absorbing energy when the crash can is subject to a collision. Various exemplary crash cans provided herein increases plastic deformation, and thus the amount of energy absorbed, by increasing the probability that the crash cans buckle in a progressive manner. Thus, the multi-cell structure of the exemplary crash cans increases the probability that when subjected to axial force the crash cans will buckle in a stable top-down, progressive folding of the structure.

Increasing plastic deformation in this manner grants the multi-cell crash can several advantages. For example, increasing plastic deformation in turn increases the amount of energy that will be absorbed during a collision, resulting in lower deceleration for the occupant(s) and critical components of a vehicle involved in a collision. This, in turn, results in an overall safer experience for the occupant(s) and critical components, providing for a lower chance of injury or damage. Additionally, increasing the probability that the multi-cell crash can buckles in a stable manner increases the predictability of how the crash can will react when subject to a collision, which in turn increases the predictability of how the rest of the vehicle will react. This allows for greater predictability of what an occupant will experience and allows for more precise planning on how to keep the occupant safe.

In particular, the interior walls of the multi-cell structure create a more rigid structure that is less likely to globally bend during progressive buckling. The increased stability granted by the interior walls of the multi-cell structure increase the probability that axial buckling will occur in a stable, progressive manner.

Another advantage of the various embodiments of a crash can disclosed herein is that the crash can may be manufactured using an extrusion process. Extrusion is the process of forcing material (e.g., aluminum or aluminum alloy) to flow through a shaped opening in a die. This results in an elongated piece of material with the same profile as the shaped opening.

In some embodiments, the material (e.g., Al) is heated (e.g., to substantially 800-925 degrees Fahrenheit) so that it is soft but still solid, and then transferred to a cradle that holds the heated material. A ram pushes the heated material through the die. The die may be cooled (e.g., by flowing liquid nitrogen or nitrogen gas around section of the die). The temperature of the extruded material is optionally monitored as the extrusion exits the die. The target exit temperature depends upon the alloy. For example, the target minimum exit temperature for the alloys 6063, 6463, 6063A, and 6101 is substantially 930° F. The target minimum exit temperature for the alloys 6005A and 6061 is substantially 950° F. For 6000 series alloys, die exit temperatures around 930-980° F. may result in optimum mechanical properties.

The extruded material is pulled to guide the material as it is pushed out of the die. The extrusion is cooled (e.g., quenched) as it is being pulled. Various cooling techniques may be used. For example, the material may be cooled by a series of fans along the length of extrusion. The extrusion for some materials (e.g., alloy 6061) may be water quenched and/or air quenched. After the material has cooled, it is stretched to straighten the extrusion and re-aligns the molecules of the material. Re-alignment increases the hardness and improves the strength of the material. In some embodiments the crash can is comprised of an aluminum alloy, such as 6005A-T61, 6063, or 6061. Optionally, the aluminum alloy includes silicon manganese. In some embodiments, the material is highly thermally conductive (e.g., to remove heat during quenching) and/or has limited anisotropic characteristics.

Many factors affect the extrusion process, including shape, size (e.g., lateral extent), and material (e.g., alloy) of the parts being extruded. There are various features of the crash cans disclosed herein that allow them to be manufactured using the extrusion process and which improve the extrusion process to enhance the characteristics (e.g., strength, uniformity, etc.) of the finished crash can.

One characteristic of the crash can that improves the extrusion process is that all embodiments of the crash can are hollow. Thus, the openings at each end provide access to the inner portion of the material and provide more surface area for coolant to interact with during the extrusion process. This provides for better control of the temperature of the material during the extrusion process, which allows for less variation in temperature across each section. This, in turn, enables the material to be cooled more uniformly during the extrusion process which reduces the amount of non-uniformity in the material of the finished part. This increases the strength and predictability of the resulting crash can.

Further, the extrusion process itself has various advantages. For instance, the extrusion process allows the crash can to be formed from a single piece of material (e.g., aluminum alloy), which improves its strength over crash cans that consist of several pieces that are subsequently connected, creating joints, seams, or other connections that introduce weak spots and points of potential failure. Further, the material used during an extrusion process (e.g., aluminum alloy) is substantially lighter than materials used to create similar crash cans without an extrusion process (e.g., steel). This allows for a lighter overall structure, which can allow for further advantages when using the crash can in a motor vehicle, such as greater fuel efficiency or greater flexibility in weight allowances.

The increased safety provided by the crash can combined with the benefits of extruding further allow for greater flexibility when designing and creating motor vehicles. This provides for a continued high level of safety for the occupant while allowing for the use of different components and design choices. This increases the commercial viability of the vehicle by granting the designer greater freedom when distributing weight and making aesthetic decisions while ensuring that safety will still be provided to an occupant based on the energy absorbed by the crash can.

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the crash can structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A crash can for a vehicle, the crash can comprising:
   a multi-cell structure comprising:
   a hollow cuboid having four walls;
   four hollow isosceles trapezoidal prisms, each having a long base, a short base, and two legs;
   wherein the four hollow isosceles trapezoidal prisms are arranged around the hollow cuboid, such that the long base of each hollow isosceles trapezoidal prism shares one of the walls of the hollow cuboid.

2. The crash can of claim 1, wherein a cross section of the crash can forms a substantially cross shape.

3. The crash can of claim 1, wherein the short base of each hollow isosceles trapezoidal prism joins the legs such that an obtuse corner angle is created at each junction.

4. The crash can of claim 3, wherein the obtuse corner angle is between 90 degrees and 95 degrees.

5. The crash can of claim 1, wherein the long base of each hollow isosceles trapezoidal prism joins the legs such that an acute corner angle is created at each junction.

6. The crash can of claim 5, wherein the acute corner angle is between 85 degrees and 90 degrees.

7. The crash can of claim 1, wherein the multi-cell structure is comprised of aluminum alloy.

8. The crash can of claim 7, wherein the multi-cell structure is comprised of an extruded piece of aluminum alloy.

9. The crash can of claim 1, wherein each of the walls, the long base, the short base and the two legs is between 1 mm and 3.5 mm thick.

10. The crash can of claim 1, wherein the length of the walls of the hollow cuboid is between 26 mm and 38 mm.

11. The crash can of claim 1, wherein the long base of each of the four hollow isosceles trapezoidal prisms is the same length as the walls of the hollow cuboid.

12. The crash can of claim 1, wherein the length of the long base of each of the four hollow isosceles trapezoidal prisms is between 26 mm and 38 mm.

13. The crash can of claim 1, wherein each of the four hollow isosceles trapezoidal prisms also includes a height, measured from the long base to the short base.

14. The crash can of claim 13, wherein the height is the same as the length of the long base of each of the four hollow isosceles trapezoidal prisms.

15. The crash can of claim 1, wherein the multi-cell structure further comprises an outside corner at each junction where one of the short bases meets one of the legs, wherein the outside corners are rounded.

* * * * *